(12) United States Patent
Schwabl et al.

(10) Patent No.: US 10,661,478 B2
(45) Date of Patent: May 26, 2020

(54) APPARATUS FOR THE PRODUCTION OF A MIXTURE OF AT LEAST ONE GAS AND AT LEAST ONE LIQUID PLASTIC COMPONENT

(71) Applicant: Sonderhoff Engineering GmbH, Dornbirn (AT)

(72) Inventors: Christian Schwabl, Bregenz (AT); Mario Metzler, Lustenau (AT)

(73) Assignee: HENKEL AG & CO. KGAA, Düsseldorf (DE)

( * ) Notice: Subject to any disclaimer, the term of this patent is extended or adjusted under 35 U.S.C. 154(b) by 120 days.

(21) Appl. No.: 15/741,396

(22) PCT Filed: Jun. 24, 2016

(86) PCT No.: PCT/AT2016/050225
§ 371 (c)(1),
(2) Date: Jan. 2, 2018

(87) PCT Pub. No.: WO2017/004634
PCT Pub. Date: Jan. 12, 2017

(65) Prior Publication Data
US 2018/0370075 A1    Dec. 27, 2018

(30) Foreign Application Priority Data
Jul. 3, 2015    (AT) ...................... 434/2015

(51) Int. Cl.
*B29C 45/17*    (2006.01)
*B01F 3/04*    (2006.01)
(Continued)

(52) U.S. Cl.
CPC .......... *B29B 7/603* (2013.01); *B01F 3/04446* (2013.01); *B01F 3/04992* (2013.01);
(Continued)

(58) Field of Classification Search
CPC .. B29C 45/17; B01F 3/04992; B01F 3/04446; B01F 15/0458
(Continued)

(56) References Cited

U.S. PATENT DOCUMENTS 4,118,799 A    10/1978    Krueger
4,171,191 A    10/1979    Krueger
(Continued)

FOREIGN PATENT DOCUMENTS

DE    27 43 452    3/1978
DE    29 17 865    11/1979
(Continued)

OTHER PUBLICATIONS

International Search Report dated Sep. 20, 2016 in International (PCT) Application No. PCT/AT2016/050225.
(Continued)

*Primary Examiner* — Robert A Hopkins
(74) *Attorney, Agent, or Firm* — Wenderoth, Lind & Ponack, L.L.P.

(57) ABSTRACT

An apparatus, for producing a mixture of at least one gas and at least one liquid plastic component, includes a mixing device that is connected, via a first pipe, to an introducing device for the at least one gas and is connected, via a second pipe, to a conveying device for the at least one liquid plastic component. The introducing device and the conveying device are piston pumps that have pistons.

7 Claims, 4 Drawing Sheets

(51) Int. Cl.
*B01F 15/00* (2006.01)
*B29B 7/60* (2006.01)
*F04B 9/133* (2006.01)
*F04B 13/02* (2006.01)
*F04B 15/02* (2006.01)
*B29B 7/74* (2006.01)
*B01F 15/04* (2006.01)
*F04B 9/113* (2006.01)

(52) U.S. Cl.
CPC ........ *B01F 15/0458* (2013.01); *B29B 7/7409* (2013.01); *B29B 7/7414* (2013.01); *B29B 7/7433* (2013.01); *B29B 7/7466* (2013.01); *B29B 7/7485* (2013.01); *B29C 45/17* (2013.01); *F04B 9/133* (2013.01); *F04B 13/02* (2013.01); *F04B 15/02* (2013.01); *F04B 9/113* (2013.01)

(58) Field of Classification Search
USPC ..................................................... 366/152.1
See application file for complete search history.

(56) References Cited

U.S. PATENT DOCUMENTS

| | | |
|---|---|---|
| 5,545,029 A | 8/1996 | Hauser |
| 5,874,031 A | 2/1999 | Okuda et al. |
| 5,942,258 A | 8/1999 | Hauser |
| 5,984,280 A | 11/1999 | Okuda et al. |
| 6,538,040 B1 | 3/2003 | Okuda et al. |
| 7,338,980 B2 | 3/2008 | Okuda et al. |
| 8,304,456 B2 | 11/2012 | Kamiyama et al. |
| 2002/0132859 A1 | 9/2002 | Okuda et al. |
| 2005/0029304 A1 | 2/2005 | Okuda et al. |
| 2016/0102658 A1 | 4/2016 | Wichmann |

FOREIGN PATENT DOCUMENTS

| | | | |
|---|---|---|---|
| EP | 0 776 745 | 6/1997 | |
| EP | 0 810 917 | 12/1997 | |
| EP | 2 067 992 | 6/2009 | |
| FR | 2 595 121 | 9/1987 | |
| GB | 1 503 648 | 3/1978 | |
| JP | 60201918 A | * 10/1985 | ............ B29C 45/17 |
| JP | 06-198152 | 7/1994 | |
| JP | 07-016852 | 1/1995 | |
| JP | 09-206638 | 8/1997 | |
| JP | 11-500373 | 1/1999 | |
| JP | 2004-001571 | 1/2004 | |
| JP | 2006-218800 | 8/2006 | |
| JP | 3851895 | 11/2006 | |
| RU | 2 164 304 | 3/2001 | |
| RU | 2 258 156 | 8/2005 | |
| RU | 83 809 | 6/2009 | |
| WO | 96/26057 | 8/1996 | |
| WO | 2014/195312 | 12/2014 | |

OTHER PUBLICATIONS

Search Report dated Feb. 1, 2016 in Austrian Application No. A 434/2015, with English translation.

* cited by examiner

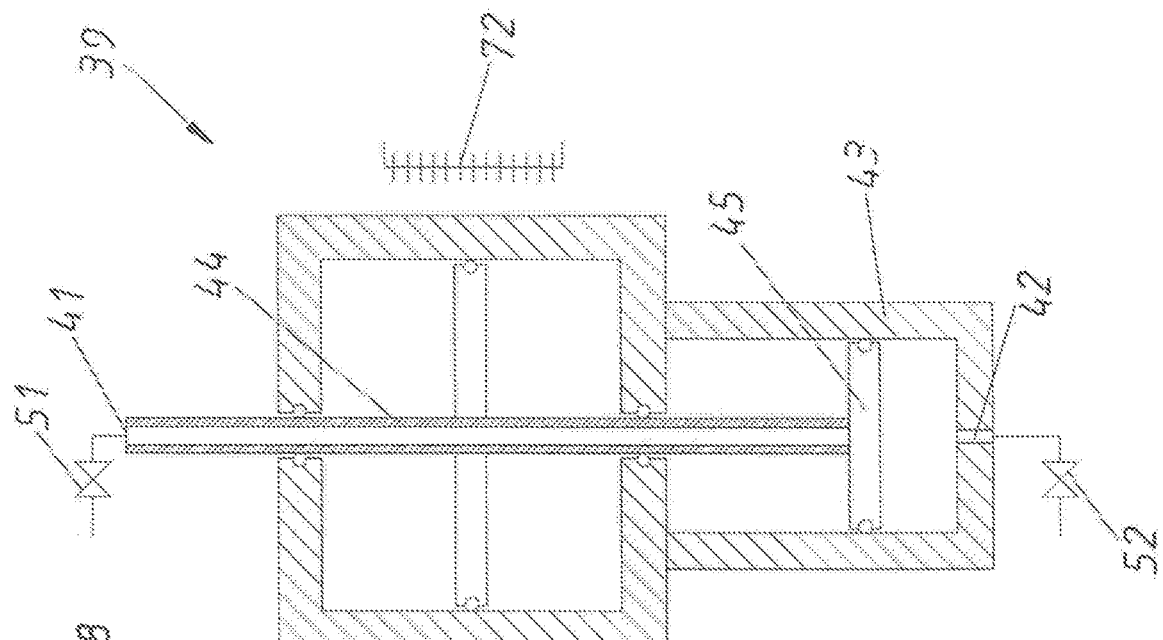
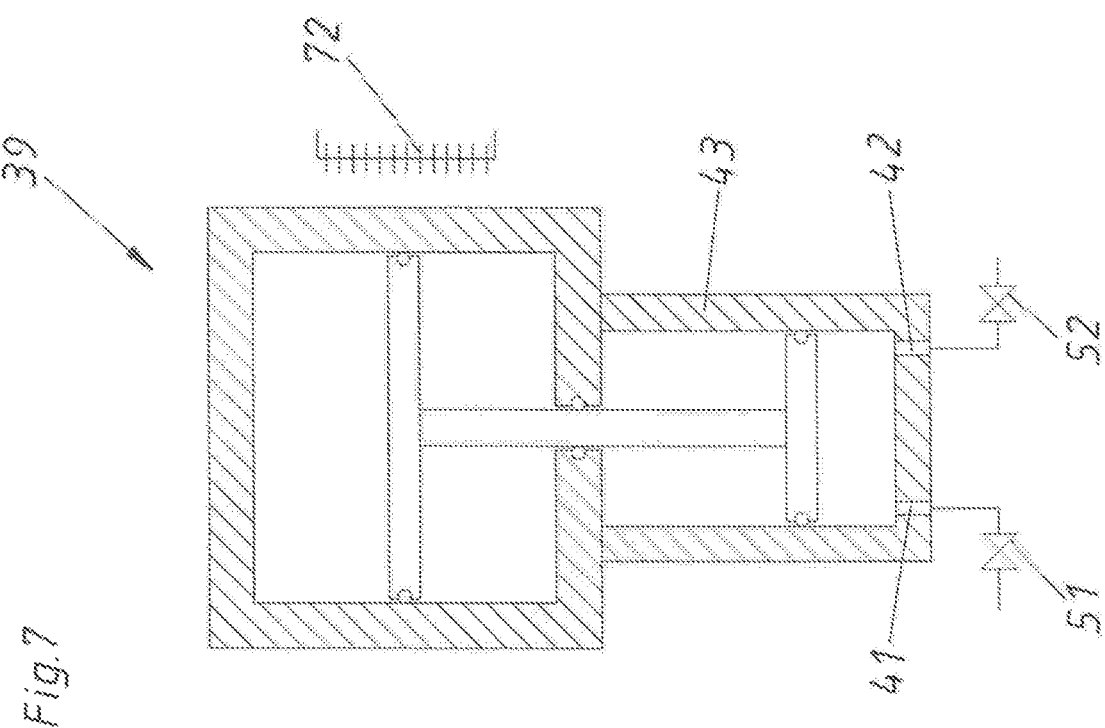

US 10,661,478 B2

APPARATUS FOR THE PRODUCTION OF A MIXTURE OF AT LEAST ONE GAS AND AT LEAST ONE LIQUID PLASTIC COMPONENT

BACKGROUND OF THE INVENTION

1. Field of the Invention

The present invention relates to an apparatus for producing a mixture of at least one gas and at least one liquid plastic component.

2. Description of the Related Art

Such an apparatus comes from FIG. 10 of EP 0 776 745 B1. There, the introducing device for the at least one gas is designed in the form of a compressed gas cylinder. The conveying device for the at least one liquid plastic component is present in the form of a pump. In other figures of this specification, piston pumps are also disclosed. The at least one gas and the at least one liquid plastic component are mixed in the piston pumps themselves. The supply of the gas is carried out and regulated via a valve. As described in this specification, it is difficult to introduce the correct quantity of gas in the correct ratio into the liquid plastic component.

SUMMARY OF THE INVENTION

The object of the invention is to provide an apparatus in which the above-described problems are avoided.

This object is achieved by the apparatus. Advantageous embodiments of the invention are defined in the dependent claims.

The use of piston pumps both for the at least one gas and for the liquid plastic component allows the accurate metering out of gas relative to liquid plastic component. If it is assumed that there is a specific maximum filling volume of the piston pump of the conveying device for the liquid plastic component and that there is a specific maximum filling volume of the piston pump of the introducing device for the at least one gas (this can be the same or different from the filling volume of the conveying device), the quantity of gas supplied to the liquid plastic component can be controlled via the pressure with which the gas is filled into the introducing device. The solution according to the invention is more cost-effective, with a simpler design and smaller size.

In principle, the piston pumps of the introducing device and of the conveying device can be operated independently of each other in the sense that they are controlled separately. In order to achieve a particularly simple and cost-effective design, it is preferably provided that the piston of the introducing device and the piston of the conveying device are mechanically or electrically coupled.

There are two design variants for this coupling. In the case of a mechanically diametrically opposed coupling, it is provided that the piston of the introducing device and the piston of the conveying device are coupled in such a way that, as gas is discharged from the introducing device, liquid plastic component is introduced into the conveying device, and, as liquid plastic component is discharged from the conveying device, gas is introduced into the introducing device. In contrast, in the case of a parallel or mechanically synchronous coupling, it is provided that the piston of the introducing device and the piston of the conveying device are coupled in such a way that, as gas is discharged from the introducing device, liquid plastic component is discharged from the conveying device, and, as gas is introduced into the introducing device, liquid plastic component is introduced into the conveying device.

Protection is also sought for an apparatus for producing foamed plastic parts, in particular sealing beads, with an apparatus according to the invention for producing a mixture of at least one gas and at least one liquid plastic component.

BRIEF DESCRIPTION OF THE DRAWINGS

Embodiments of the invention are discussed with reference to the figures.

FIG. 7 shows in detail the buffer device and FIG. 8 shows an alternative variant of the buffer device.

DETAILED DESCRIPTION OF THE INVENTION

Figure 1:
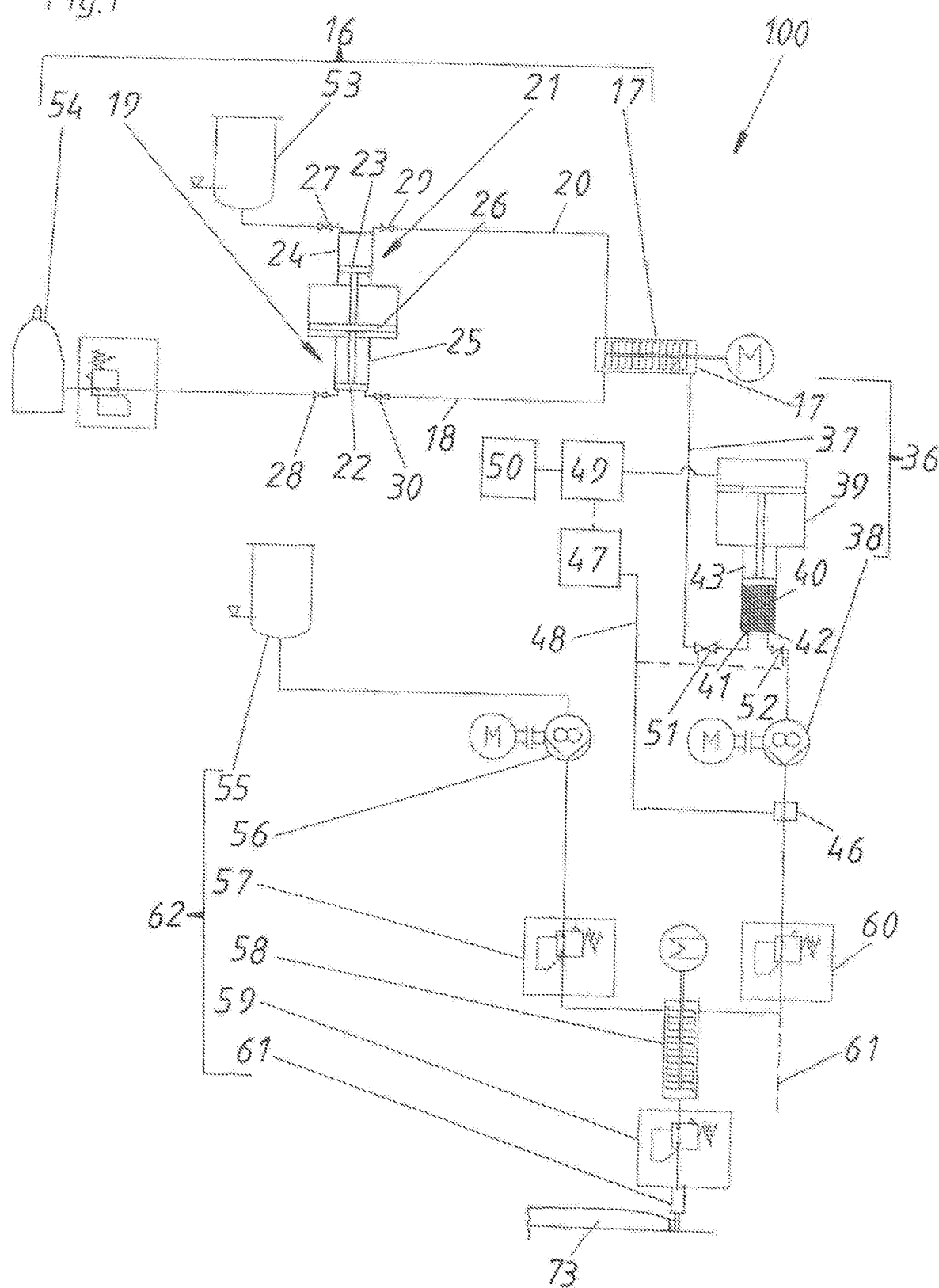
FIG. 1 shows schematically an apparatus for producing foamed plastic parts.

FIG. 1 shows schematically in its entirety an apparatus 100 for producing foamed plastic parts, in particular sealing beads. This apparatus 100 in turn comprises several fundamental subunits.

Such a subunit is formed by an apparatus 16 for producing a mixture of at least one gas and at least one liquid plastic component. This apparatus 16 in turn comprises at least a mixing device 17, an introducing device 19 for the at least one gas connected to the mixing device 17 via a first pipe 18 and a conveying device 21 for the at least one liquid plastic component connected to the mixing device 17 via a second pipe 20. In addition, this apparatus 16 comprises a container 53 for the plastic component and a gas source 54, in particular an air compressor. A feed pump could also be provided instead of the container 53.

In such an apparatus 16, in contrast to the state of the art, it is provided that the introducing device 19 and the conveying device 21 are designed as piston pumps 25 and 24 having pistons 22 and 23.

The piston 22 of the introducing device 19 (piston pump 25) and the piston 23 of the conveying device 21 (piston pump 24) are in this example mechanically coupled in a diametrically opposed manner via a pressure transformer 26. This allows the use of an actuator which operates at relatively low pressure (e.g. pneumatic), as the necessary increase in force is achieved via the force transformation. In addition, inlet valves 27, 28 and outlet valves 29, 30 can be seen.

Figure 2:
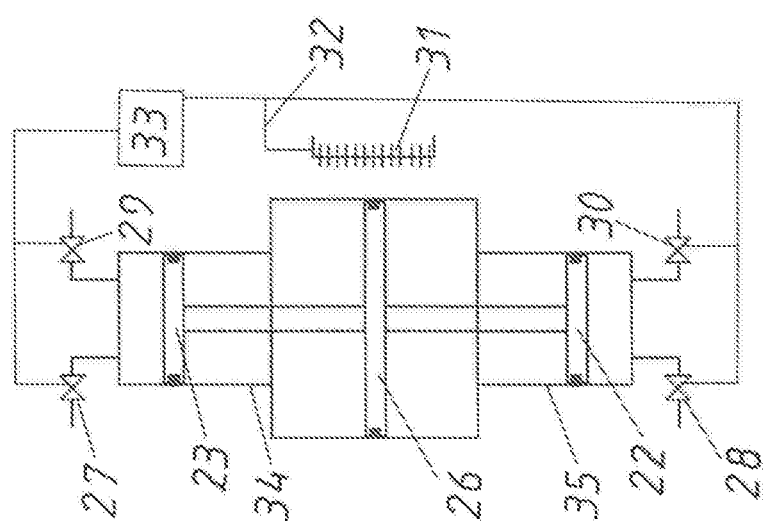
FIG. 2 shows a first embodiment example of a piston pump in which the pistons are mechanically coupled in a diametrically opposed manner.

As shown in more detail in FIG. 2, these inlet valves 27, 28 and outlet valves 29, 30 are controlled by a control device 33 coordinated with the movement of the coupled pistons 22, 23. A sensor 31 is also represented which is connected to the control device 33 via a signal line 32 for signal transmission. The sensor 31 is used to determine the position of the pressure transformer 26. The position of the pistons 22, 23 is thereby also determined. The position of the pistons 22, 23 can also be determined directly via the sensor 31 (see the further embodiment examples). In general, leakage detection can be effected with such a sensor 31, namely when the piston seals between the piston 23 and the cylinder 34 of the introducing device 19, the piston seals between the piston 22 and the cylinder 35 of the conveying device 21 and/or at least one of the valves 27 to 30 are worn. For the leakage detection, e.g. inlet valve 28 and outlet valve 30 on the gas side are closed. A compression of the gas volume located between inlet valve 28 and outlet valve 30 is carried out by the piston 22. If there is a leak, after compression has taken place an irregular movement of the pressure transformer 26 results which is detected by the sensor 31. It can also be checked whether irregular gas proportions are present in the liquid plastic component, as these result in the piston 23 moving when inlet valve 27 and outlet valve 29 are closed because the liquid plastic component is compressible due to the irregular gas proportions. This can optionally be equalized by the control device 33.

Figure 3:
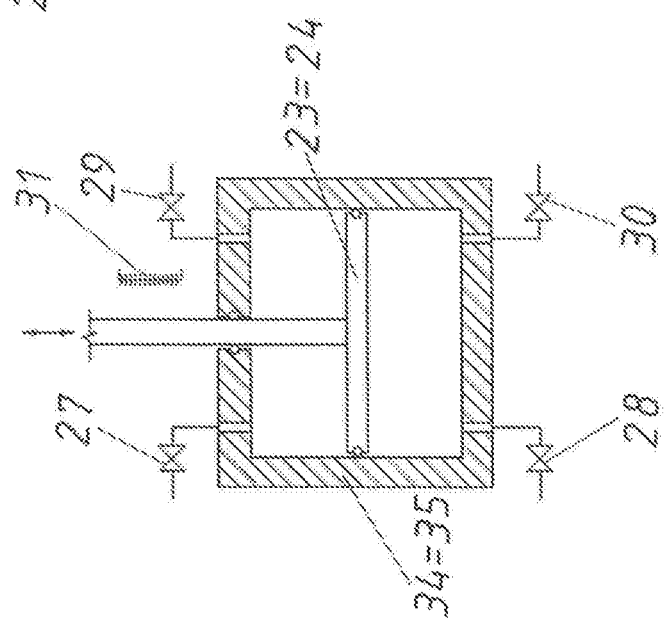
FIG. 3 shows a variant of the embodiment example of FIG. 2.

FIG. 3 shows a single piston pump which simultaneously forms the piston pump 24 for the conveying device 21 and the piston pump 25 for the introducing device 19. In this variant, a separate pressure transformer is not provided, rather one piston forms both the piston 23 of the piston pump 24 and the piston 22 of the piston pump 25. This system according to FIG. 3 also operates mechanically in a diametrically opposed manner. This means that, when gas is discharged via the introducing device 19 (represented at the bottom), liquid plastic component is introduced into the conveying device 21 and vice versa.

Figure 4:
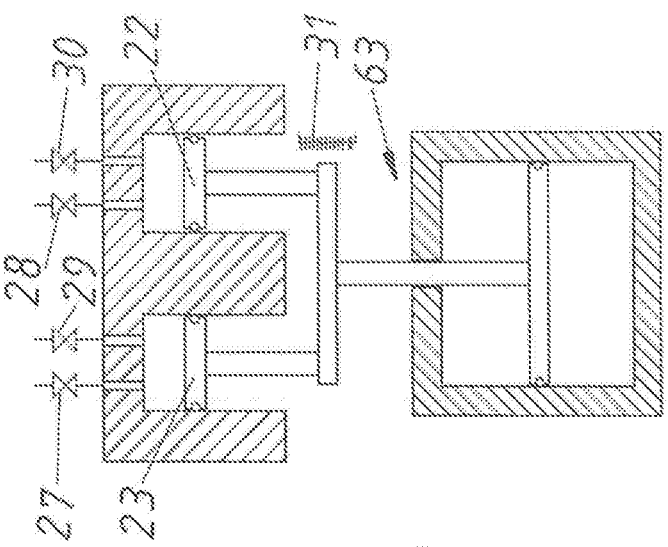
FIG. 4 shows an embodiment example of the invention in which the pistons are mechanically coupled synchronously.

In contrast, FIG. 4 shows a system in which the piston pumps 24 and 25 are mechanically coupled synchronously. Specifically, the piston 22 of the introducing device 19 and the piston 23 of the conveying device 21 are coupled via a coupling mechanism 63 in such a way that, as gas is discharged from the introducing device 19, liquid plastic component is discharged from the conveying device 21, and, as gas is introduced into the introducing device 19, liquid plastic component is introduced into the conveying device 21.

Figure 5:
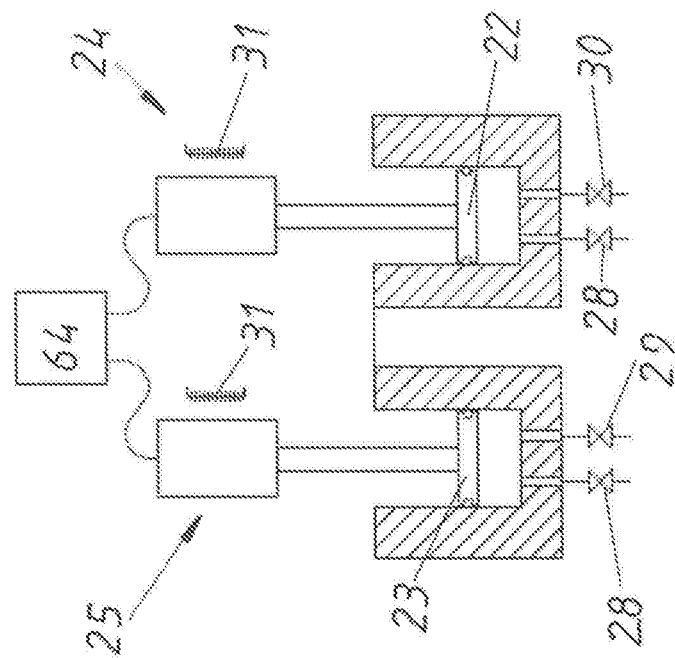
FIG. 5 shows an embodiment example of the invention in which the pistons are electrically coupled.

FIG. 5 shows an electronic coupling of the piston pumps 24 and 25. Here, the movement of the pistons 22 and 23 is controlled by a control device 64 which is connected by means of signals to actuating devices of the two piston pumps 24 and 25. The pistons 22 and 23 can be moved in a diametrically opposed manner or synchronously. This can be adjusted via the control device 64.

Figure 6:
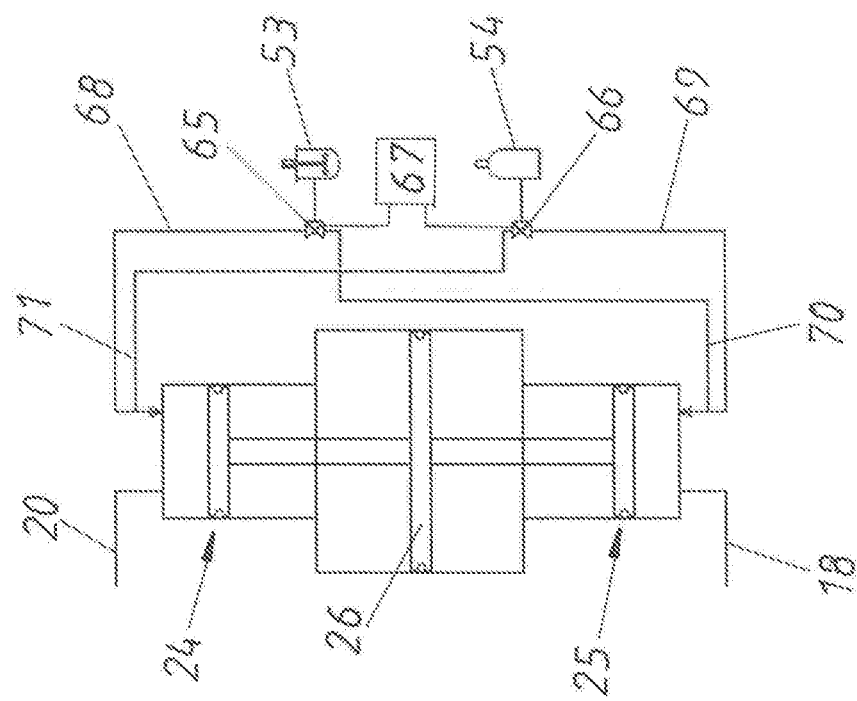
FIG. 6 shows an embodiment example of the invention, wherein one piston pump and the other piston pump are in each case alternately designed as introducing device and as conveying device.

FIG. 6 shows a piston pump 25 and a piston pump 24 which in each case alternately form the introducing device 19 or the conveying device 21. An advantage here consists in that the seals on both sides are alternately lubricated by the liquid plastic component. A switchover after a predefinable number of cycles is possible. The switchover is effected via switching device 65 and 66 which can be switched over either by hand or are preferably switched over via a control device 67, preferably regularly. In the first switch position, the liquid plastic component is conveyed from the container 53 via a first pipe 68 to the piston pump 24 (represented at the top), while the gas is conveyed from the gas source 54 via the second pipe 69 to the piston pump 25. To this extent, the entire system in this first switch position conforms with FIGS. 1 and 2. In the second switch position, however, a deviation occurs. Specifically, in this second switch position the liquid plastic component is conveyed from the container 53 via a third pipe 70 to the piston pump 25 (represented at the bottom), while the gas is conveyed from the gas source 54 via a fourth pipe 71 to the piston pump 24. In this second switch position—conversely to the first switch position—the piston pump 25 thus forms the conveying device 21 and the piston pump 24 thus forms the introducing device 19. Depending on the switch position, the liquid plastic component or the gas is then pumped further to the mixing device 17 via the first pipe 18 or the second pipe 20, respectively.

Returning to FIG. 1, a further subunit of the apparatus 100 is formed by an apparatus 36 for providing a liquid plastic component, preferably mixed with gas, for a metering device 38. This apparatus 36 comprises a source 37 of at least one liquid plastic component. This source 37 is preferably formed by a pipe which leads away from the mixing device 17 already mentioned. This apparatus 36 further comprises an intermittently operating transfer device for the at least one liquid plastic component. This intermittently operating transfer device is formed by the piston pumps 24, 25, but can also be another device of any desired design which is suitable for intermittently transferring the liquid plastic component. By an intermittently operating source is meant not only a source the delivery rate of which drops to zero (e.g. a piston pump), but also a source the delivery rate of which is subject to, in particular pulsing, fluctuations (e.g. gear pump).

The apparatus 36 additionally comprises a metering device 38, preferably a metering pump, for which the plastic component is provided by the transfer device. Moreover, the apparatus 36 comprises a buffer device 39 with a variable buffer volume 40 arranged between the source 37 of the at least one liquid plastic component and the metering device 38, by means of which buffer device 39 the liquid plastic component intermittently conveyed to it is constantly made available to the metering device 38 in sufficient quantity with sufficient charging pressure. After the metering device 38, the plastic component arrives at a metering valve 60, after which the plastic component is discharged directly (see nozzle 61 represented by a dashed line)—or, as represented in FIG. 1, indirectly via a further mixing element 58—via a nozzle 61 and, through the discharging and the associated drop in pressure, is foamed.

In order to enable as even as possible a transfer it is preferably provided that the pressure prevailing in the liquid plastic component between buffer device 39 and metering device 38 can be controlled by the buffer device 39. The liquid plastic component passes via an inlet opening 41 from the source 37 into the buffer volume 40 of the buffer device 39. The buffer volume 40 is in turn connected to the metering device 38 via an outlet opening 42. In FIG. 1, the inlet opening 41 is formed in a wall of a housing 43 of the buffer device 39. This can also be seen in FIG. 7. Alternatively, it can however also be provided that the inlet opening 41 is formed in a piston rod 44, connected to a piston 45, of the buffer device 39 (see FIG. 8). Furthermore, an inlet valve 51 is arranged before the inlet opening and an outlet valve 52 is arranged after the outlet opening 42. In addition, a position sensor 72 can be provided, with which at least selected positions of the piston 45 in the housing 43 can be determined.

Furthermore, it is provided that a pressure sensor 46 is arranged on an exit side of the metering device 38. This pressure sensor 46 is connected to a control device 47 via a control line 48. The control device 47 controls the buffer device 39 such that the pressure applied on the entry side of the metering device 38 tracks the pressure prevailing on the exit side of the metering device 38. Furthermore, the control device 47 can be designed so as to close both the inlet valve 51 and the outlet valve 52 and to compress the liquid plastic component located in the buffer volume 40. A sensor that is not represented can also be provided, by means of which an irregular compression of the buffer volume 40 can be detected.

Furthermore, the buffer device 39 is connected to a device 49 for pressurizing the buffer device 39. This can be controlled either by the control device 47 (dashed line drawn in) or by an independent control device 50.

In principle, the two apparatuses 16 and 36 would already be sufficient for the production of foamed plastic parts in the form of sealing beads. However, it can additionally preferably be provided that a second plastic component is foamed in parallel with the first plastic component or mixed with the first plastic component to form the plastic part, preferably physically. For this reason, a further subunit of the apparatus 100 is formed by an apparatus 62 for multi-component foaming (once again see FIG. 1). This apparatus 54 comprises a container 55 for a second plastic component, from which the second plastic component, preferably mixed with gas, is passed via a metering device 56 and a metering valve 57 to the mixing element 58. In this mixing element 58, this second plastic component is mixed with the first plastic component. After a further metering valve 59, this mixture is then discharged via a nozzle 61 that is indicated schematically, whereby the gas contained in the mixture is foamed. In other words, the discharging results in a drop in pressure, the gas causes the liquid plastic component to foam and a plastic part provided with pores, for example in the form of a sealing bead 73, is formed after the foamed plastic component has hardened.

Stop valves can also be provided in the metering valves 57 and/or 60, as are used in FIG. 1 as inlet and outlet valves provided with the reference numbers 51 and 52.

LIST OF REFERENCE NUMBERS

16 Apparatus
17 Mixing device
18 First pipe
19 Introducing device
20 Second pipe
21 Conveying device
22 Piston
23 Piston
24 Piston pump
25 Piston pump
26 Pressure transformer
27 Inlet valve
28 Inlet valve
29 Outlet valve
30 Outlet valve
31 Sensor
32 Signal line
33 Control device
34 Cylinder
35 Cylinder
36 Device for transferring a liquid plastic component
37 Source
38 Metering device
39 Buffer device
40 Buffer volume
41 Inlet opening
42 Outlet opening
43 Housing
44 Piston rod
45 Piston
46 Pressure sensor
47 Control device
48 Control line
49 Pressurization device
50 Control device
51 Inlet valve
52 Outlet valve
53 Container for plastic component
54 Gas source
55 Container for second plastic component
56 Mixing device
57 Metering valve
58 Mixing element
59 Metering valve
60 Metering valve
61 Nozzle
62 Apparatus for multi-component foaming
63 Coupling mechanism
64 Control device
65 Switching device
66 Switching device
67 Control device
68 First pipe
69 Second pipe
70 Third pipe
71 Fourth pipe
72 Position sensor
73 Sealing bead
100 Apparatus for producing foamed plastic parts

The invention claimed is:

1. An apparatus for producing a mixture of at least one gas and at least one liquid plastic component, the apparatus comprising:
   a container or feed pump for the at least one liquid plastic component;
   a gas source;
   a mixing device;
   an introducing device for the at least one gas;
   a first passage which connects the mixing device to the introducing device, wherein a first end of the first passage defines an outlet passage from the introducing device and a second end of the first passage defines a first inlet passage into the mixing device;
   a conveying device for the at least one liquid plastic component;
   a second passage which connects the mixing device to the conveying device, wherein a first end of the second passage defines an outlet passage from the conveying device and a second end of the second passage defines a second inlet passage into the mixing device;
   a first connecting passage which connects the container or feed pump to the conveying device, wherein the conveying device is between the container or feed pump and the mixing device, and wherein a first end of the first connecting passage defines an outlet passage from the container or feed pump and a second end of the first connecting passage defines an inlet passage into the conveying device; and
   a second connecting passage which connects the gas source to the introducing device, wherein the introducing device is between the gas source and the mixing device, and wherein a first end of the second connecting passage defines an outlet passage from the gas source and a second end of the second connecting passage defines an inlet passage into the introducing device, wherein each of the introducing device and the conveying device is a piston pump having a piston.

2. The apparatus according to claim 1, wherein the piston of the introducing device and the piston of the conveying device are mechanically or electrically coupled.

3. The apparatus according to claim 2, wherein the piston of the introducing device and the piston of the conveying device are coupled such that, as gas is discharged from the introducing device, liquid plastic component is introduced into the conveying device, and, as liquid plastic component is discharged from the conveying device, gas is introduced into the introducing device.

4. The apparatus according to claim 2, wherein the piston of the introducing device and the piston of the conveying device are coupled such that, as gas is discharged from the introducing device, liquid plastic component is discharged from the conveying device, and, as gas is introduced into the introducing device, liquid plastic component is introduced into the conveying device.

5. The apparatus according to claim 2, wherein both piston pumps in each case alternately form the introducing device or the conveying device.

6. A system for producing foamed plastic parts, the system comprising the apparatus according to claim 1.

7. The system according to claim 6, wherein the foamed plastic parts are sealing beads.

* * * * *